United States Patent [19]

Williamson et al.

[11] Patent Number: 4,815,907

[45] Date of Patent: Mar. 28, 1989

[54] EASTENER FOR STRUCTURES MADE OF COMPOSITE MATERIALS

[75] Inventors: Herman L. Williamson, Seal Beach; Edwin E. Hatter, Torrance; Gerhart Hufnagl, Lomita, all of Calif.

[73] Assignee: Hi-Shear Corporation, Torrance, Calif.

[21] Appl. No.: 849,352

[22] Filed: Apr. 7, 1986

Related U.S. Application Data

[63] Continuation of Ser. No. 568,592, Jan. 6, 1984, abandoned.

[51] Int. Cl.[4] .......................... F16B 39/00; F16B 23/00
[52] U.S. Cl. .................................. 411/107; 411/180; 411/399; 411/413; 403/408.1
[58] Field of Search ................ 411/107, 366, 113, 399, 411/166, 324, 171, 411, 178, 453, 176, 455, 301, 408, 412–416, 968, 423, 180, 302; 403/388, 401, 408.1

[56] References Cited

U.S. PATENT DOCUMENTS

| | | | |
|---|---|---|---|
| 3,418,012 | 12/1968 | LaTorre | 403/408 |
| 3,630,253 | 12/1971 | Sherman | 411/166 |
| 3,661,406 | 5/1972 | Mele | 403/408 |
| 3,834,438 | 9/1974 | Ziaylek, Jr. | 411/113 |
| 3,865,006 | 2/1975 | Massoney | 411/394 |
| 4,097,168 | 6/1978 | Pagel | 411/176 |

FOREIGN PATENT DOCUMENTS

| | | | |
|---|---|---|---|
| 646701 | 10/1962 | Italy | 411/386 |
| 886061 | 1/1962 | United Kingdom | 411/411 |

*Primary Examiner*—Neill Wilson
*Attorney, Agent, or Firm*—Donald D. Mon

[57] ABSTRACT

A fastener and a joint including the fastener, wherein the material in which the fastener is set is a composite. The fastener has a shank with an external helical rib that makes a slightly tighter than net to a moderate interference fit in a cylindrical wall of the hole. The rib has a form whose maximum radial protrusion is flat or convex, and which extends away from its maximum protrusion as a convex curve, devoid of sharp cutting edges. Voids between the convolutions of the rib are adequate to receive displaced material of the hole wall.

6 Claims, 2 Drawing Sheets

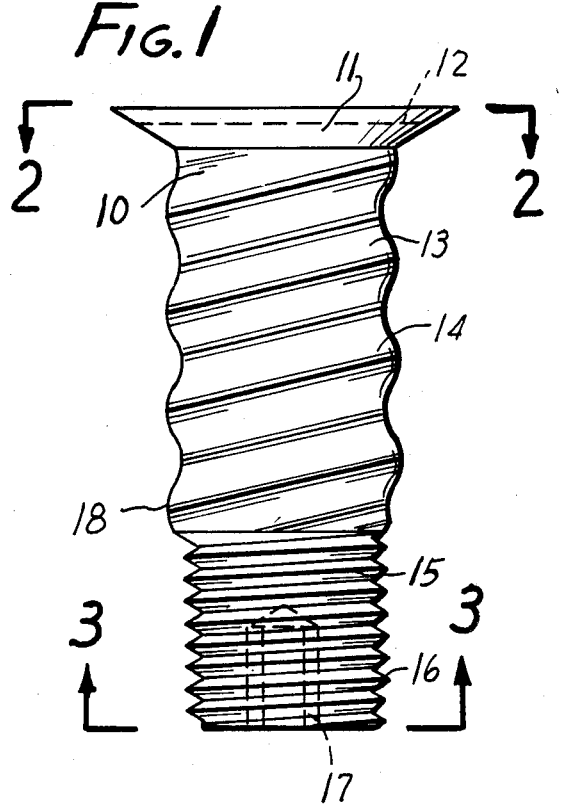
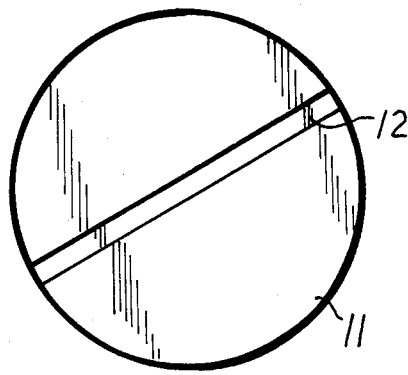
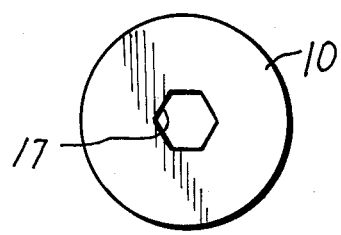
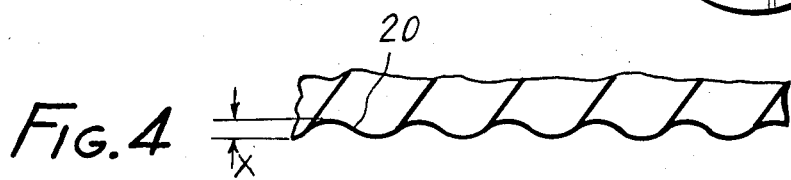
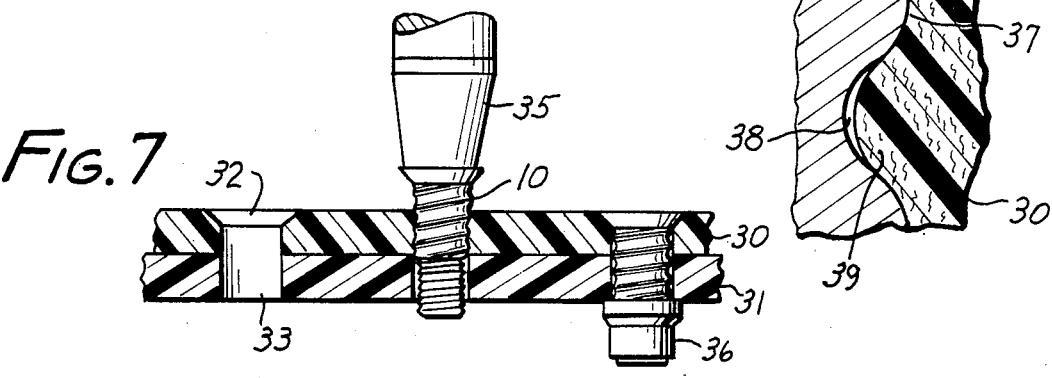

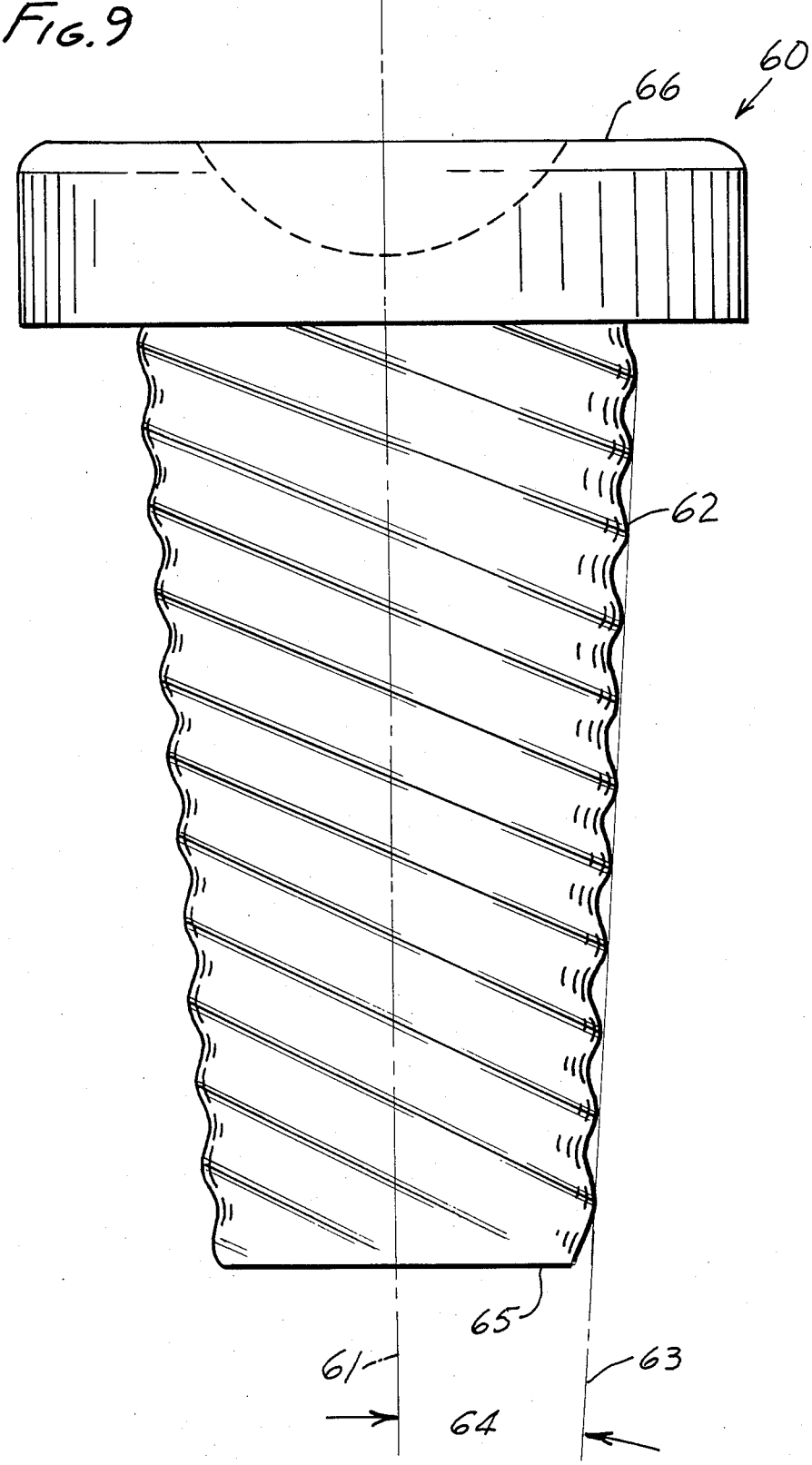

ically practical tolerance allowances for its inside diameter.

FASTENER FOR STRUCTURES MADE OF COMPOSITE MATERIALS

This is a continuation of co-pending application Ser. No. 568,592 filed on Jan. 6, 1984, now abandoned.

FIELD OF THE INVENTION

This invention relates to a fastener for use in composite material structures.

BACKGROUND OF THE INVENTION

The fastener types required for joining composite materials must meet criteria that are quite different from those fasteners which are acceptable for joining homogeneous metallic materials. Composite materials are generally constructed of high-strength fibers, sometimes of carbon or graphite material for light weight, which are contained in a resin base for form and rigidity. Epoxy resins are commonly used, but others are also useful. During the installation of a fastener it is essential that the strength of the laminate composite is not exceeded, in particular with respect to the bond between the fiber lamination and the resin binders. If the ultimate strength of this cohesion is exceeded, then the material will be delaminated in the area of the fastener and can lead to early corrosion and fatigue failure of the joint. Therefore, it is essential that the installation pressures be minimized, but for economic reasons it is desirable to be able to produce a hole with economically practical tolerance allowances for its inside diameter.

It is also necessary to produce a fastener to fit in the laminar material hole that will be close enough to prevent excessive working of the hole under stress by movement of the joint. Such movement can produce very deleterious high localized stress concentrations.

A further risk to be avoided in the installation of fasteners in composite materials is the inducement of such high radial stresses as may produce delamination of the material.

BRIEF DESCRIPTION OF THE INVENTION

The fastener of the present invention includes a shank having a helical rib-like protrusion of precise definition to enable the rotational installation of the fastener shank through a composite material workpiece. This rib or lobelike protrusion has a height which will permit a limited interference with the hole through the workpiece, and a geometric configuration that will allow the flow of material displaced into the recess formed at the base of the helical lobe such that excess radial pressures will not be built up in the composite workpiece, thereby to prevent delamination. The rotational installation procedure prevents a buildup of pressure as the fastener is inserted into the hole in the composite material whereby to prevent delamination at the exit of the fastener shank from the composite material.

The above and other features of this invention will be fully understood from the following detailed description and the accompanying drawings, in which:

BRIEF DESCRIPTION OF THE INVENTION

FIG. 1 is a side view of an embodiment of the invention;

FIG. 2 is a top view of the embodiment of FIG. 1 taken at line 2—2 of FIG. 1;

FIG. 3 is a bottom view of the embodiment of FIG. 1 taken at line 3—3 of FIG. 1;

FIG. 4 is a fragmentary perspective view of the external shank periphery of the embodiment of FIG. 1;

FIGS. 5 and 6 are fragmentary views like FIG. 4 showing alternate embodiments;

FIG. 7 is a cross-section showing of two workpieces being joined with the embodiment of FIG. 1;

FIG. 8 is a fragmentary section showing a portion of the fully installed fastener embodiment of FIG. 7; and FIG. 9 is an side view of another embodiment of the invention.

DETAILED DESCRIPTION OF THE INVENTION

In FIG. 1, the preferred embodiment is shown of a fastener 10 according to the invention. Fastener 10 has a head 11, which is provided with a recess 12 for engagement by a screwdriver for rotation to install fastener 10. A fastener shank 13 has a lobular helical protrusion 14 which progresses for the length of the shank 13. The fastener engaging end 15 of the fastener 10 is provided with screw threads 16 for engagement by a threaded device such as a nut or collar to complete the installation.

An internal non-circular recess 17, conveniently hexagonal, can optionally be provided for wrench engagement of a wrenching tool to prevent rotation of the fastener 10 while installing the nut when completing the assembly. This is generally provided when head is not accessible for restraining the fastener.

FIG. 4 shows an embodiment of the lobular helix with which the shank 13 of the fastener 10 may be provided. Equally spaced lobes 20 extend the full length of the helix, thereby giving equal-value protrusions and depressions. A characteristic of this kind of design is that the displaced material of the workpiece must be less than the volume defined between the lobes, and the depression of the helix should allow for this displacement of the material. Therefore the interference between the crest of the helix must be somewhat less than half of the total height of the helix.

In the Figs, the radial protrusion of the radius of the lobes is shown as constant from end to end. Alternatively, it could increase as it extends toward the headed end of the fastener.

The embodiment of FIG. 5 shows the same geometry. In FIG. 6, the lobular helix is spaced so that there is a relatively flat helical area between the helical progression of lobes which allows for a larger volume displacement of the composite workpiece material by the lobular protrusions. Therefore the fastener may be installed with more volume of unfilled void and smaller friction forces.

The lobes 20 of FIG. 4 have a preferred height of about 0.006 (+0.003 to 0.00)inches, and are smooth and continuous. This height is a function of the workpiece plasticity and may vary beyond these limits. The pitch of the helix will vary depending on the diameter of the particular fastener being designed, but in general will be between about 32 and 18 pitches of lobular ribs to the inch. This can vary depending on the function of the part, the properties of the composite, and the convenience of the tooling.

FIG. 7 shows two sheets of composite material 30 and 31 which are to be joined by the fastener 10 embodiment of FIG. 1. A cylindrically-walled hole is first prepared to receive the fastener. The diameter of the hole 33 is calculated to make either a slightly tighter than net-contact fit with diameter 18 of the lobular protrusion 14 of fastener 10 or to form in its minimum dimension an interference fit of from 0.001 inch to 0.003 inch when compared to the maximum diameter of lobular protrusion 18. An optional countersink 32 is formed at one end of hole 33.

In FIG. 7, fastener 10 is shown partially inserted into hole 32 by means of turning screwdriver 35 in a clockwise direction so that the lobes 14 engage the wall of hole 33. The fastener 10 therefore "threads" itself into the cylindrical hole 32 which is smaller in diameter than the crest of lobular rib 18. The fastener becomes self-fitting with a very small initial starting thrust force. The form of the helical lobe provides escape space for the displaced resin of the workpiece. Intimate contact is achieved between the fastener shank and in much or all of the hole wall without excessive hole expansion that might produce crazing and delamination. Further, there is no direct longitudinal force along the fastener 10 axis between the shank 13 and the wall of the hole. Therefore there is no force across the laminate structure, and delamination of the composite is prevented.

Intimate contact between the fastener shank 13 and the wall of the hole improves the joint stability, because it prevents fastener tilting and structural shifting between the composite material 30 and 31 under the application of load. Of particular importance is the prevention of fastener tilting which could result in local stress concentration at the contact point between a tilted fastener and the composite surface, and thus initiate a progressive failure mode. Joint shifting and fastener tilting are normal occurrences when joints with clearance-fit fasteners are subjected to load.

In FIG. 8 it can be seen how the material of the composite flows toward the root of the helical lobe 14 to prevent a buildup of excessive stress that could yield potential delamination of the composite material. The root 37 of lobular helix 14 receives the composite material 30 that is displaced by the diametral extremity 37 of lobular helix 14. The diameter of the hole is held to a value that provides for excess void volume 37 to receive the displaced material 38. Completed installation of the fastener is shown in FIG. 7 with the installation of a nut 36.

FIG. 9 shows a fastener 60 with a central axis 61 and an external thread 62 as already described. A line 63 represents the extent of radial protrusion of the rib of said thread which instead of being parallel to axis 61, forms an angle 64 relative to it. Thus the radial protrusion of the rib increases as it extends from its second end 65 toward its first end 66.

The term "lobular" is used herein to define a helical form which is other than a relatively abrupt conventional thread, such as acme, or sharp crested, whose edges would tend to cut into the workpiece. The form of this invention will preferably be gently curved at its crest, or if the crest is a flat area, as it is in FIG. 7, the form departs from the flat area by way of a gentle curve at each side. With this shape, the composite material is gradually displaced without cutting or separating it, and it can flow into the void.

The term "composite material" is used to denote materials of the type in which fibers, clothes woven of fibers, and the like, are embedded in a matrix, for example an inorganic plastic material, that serves to hold the body as an integral member, without supplying a major portion of its intended strength. The fibers of the cloth provide that strength. Such materials do not cold work, and it is necessary, when deforming them, to do so in such a way as not to destroy the integrity of the body, such as by cracking or delamination. This is a reason for the gentle curvature, and for the relatively small interferences.

Although the embodiments described have been adapted for use in composite materials, many advantages of a similar nature may be gained with the use in metallic materials by modification of detailed dimensions and geometry. The examples are given by way of illustration and do not restrict the scope of the invention which is only to be restricted by the claims.

I claim:

1. A structural joint comprising:
   a plurality of members to be joined together, each member being made of a composite material comprising strength members bonded together by bonding means, said material having the property of limited deformation without delamination, there being a hole in each member bounded by a cylindrical wall having a diameter, said holes being aligned and of equal diameters; and
   a rigid metal fastener having a central axis, and comprising a shank, a head at the first end of said shank, and a fastener-engaging end portion at the second end of said shank, said shank having a central axis, and means for forming a limited deformation of said cylindrical walls comprising a thread-forming peripheral lobular rib formed as an integral part of said fastener extending from end to end of said shank, said rib being helical and having an extended continuous form with a crest, said crest being devoid of sharp cutting edges, its greatest radial protrusion being non-concave, with curved convex edges, and having a diameter greater than that of said hole so as to form a minor interference fit therein, there being sufficient void space between adjacent convolutions of said rib to accommodate the flow of material caused by said minor interference fit, whereby to form by deformation of said walls from displaced but not detached material of said walls a helical structure in said void space from end to end thereof, said minor interference fit being such that the deformation which formed said structure does not result in delamination of the material said rib having a pitch such that a purely axial force on the shank will not press the shank into the hole without axial displacement of wall material, nor will it rotate the shank in the hole, said pitch also being such that rotation of the shank will cause the protrusion to advance helically in the hole, forming said helical structure as it advances, and such that a purely axial force cannot remove the shank from the hole without obliterating said helical structure, the convolutions of said rib trapping the said structure between them to assist in holding the material against delamination.

2. A joint according to claim 1 in which the radius of said radial protrusion of said rib is constant along substantially its full length.

3. A joint according to claim 1 in which the radius of said radial protrusion of said rib increases as it extends from said second end.

4. A joint according to claim 1 in which said fastener engaging end portion includes a thread to receive a nut.

5. A joint according to claim 1 in which the rib at said greatest radial projection is flat.

6. A joint according to claim 1 in which the rib at said greatest radial projection is convexly curved

* * * * *